No. 792,259. PATENTED JUNE 13, 1905.
J. GROSSMANN.
PROCESS OF MAKING CYANIDS.
APPLICATION FILED APR. 16, 1903.
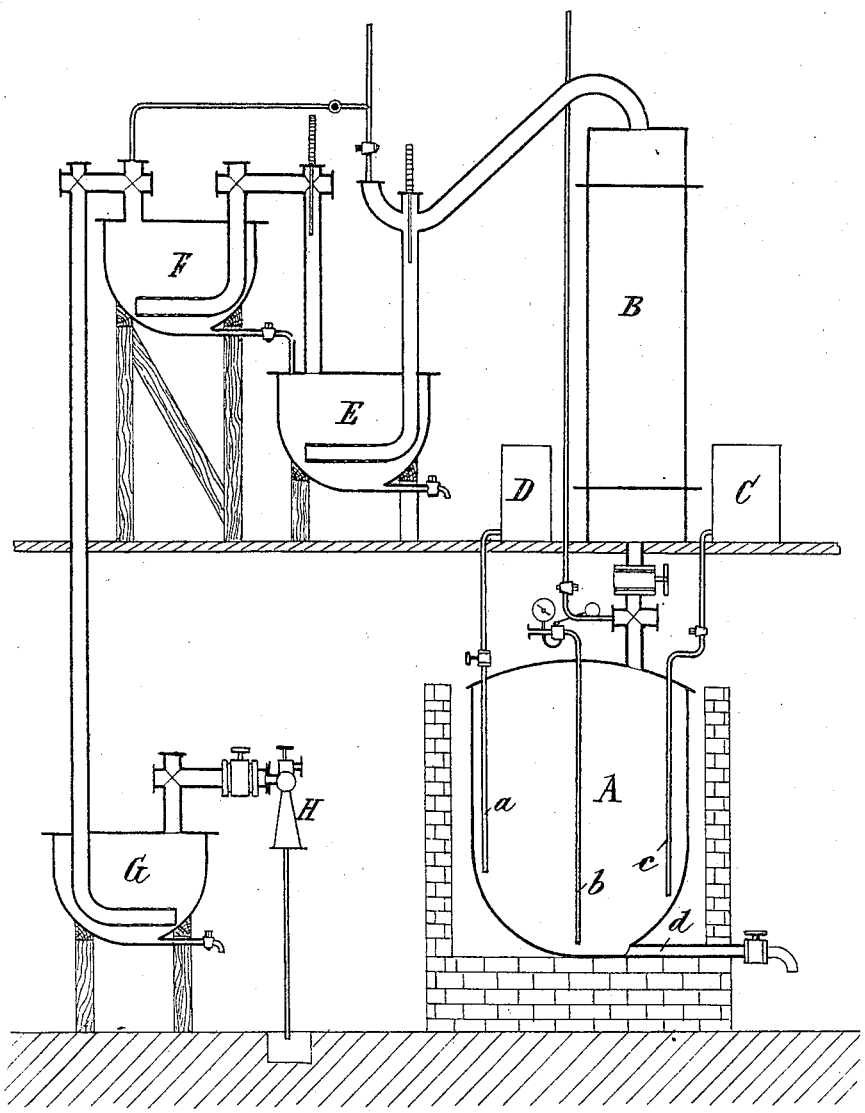
WITNESSES
INVENTOR
Jacob Grossmann
By Richards &co
ATTORNEYS No. 792,259.                                              Patented June 13, 1905.

UNITED STATES PATENT OFFICE.

JACOB GROSSMANN, OF HARPURHEY, MANCHESTER, ENGLAND, ASSIGNOR TO GROSSMANN'S CYANIDE PATENTS SYNDICATE, LIMITED, OF HARPURHEY, MANCHESTER, ENGLAND.

PROCESS OF MAKING CYANIDS.

SPECIFICATION forming part of Letters Patent No. 792,259, dated June 13, 1905.

Application filed April 16, 1903. Serial No. 152,952.

*To all whom it may concern:*

Be it known that I, JACOB GROSSMANN, a citizen of Great Britain, residing at Harpurhey, Manchester, in the county of Lancaster, England, have invented certain new and useful Improvements in and Connected with the Manufacture of Cyanids, of which the following is a full, clear, and exact description.

It has been known for many years that on distilling two molecules ferrocyanid of potash with from three to six molecules dilute sulfuric acid hydrocyanic acid is evolved and an insoluble compound containing cyanogen and called "Everitt's salt" is formed. It has also been known for many years that the Everitt's salt thus produced may be partly reconverted into ferrocyanid of potash by boiling with caustic alkali; but no method was known whereby these isolated reactions could be combined in such a manner that they would ultimately yield all the cyanogen contained in ferrocyanid of potash as hydrocyanic acid in practically quantitative proportions, nor was it known that other ferrocyanids besides the potassium ferrocyanid follow the same law. By experimenting on a commercial scale with large quantities of material and under such conditions as are the only practicable ones in dealing with such a poisonous substance as hydrocyanic acid on a large scale I have been able to devise a method and plant by which I can manufacture cyanids of good commercial quality by distilling ferrocyanids with sulfuric acid, absorbing the prussic acid evolved in alkali, and reconverting the Everitt's salt formed into ferrocyanids in such a manner as to practically obtain all the cyanogen contained in ferrocyanid without loss as cyanid of potassium, sodium, calcium, or similar compounds. I have, moreover, worked out the proportions of the substances employed and the dilution of the liquids in such a manner as are most economical and suitable for the preparation of cyanids from ferrocyanids by distilling with sulfuric acid, and particularly so for the cycle of operations which I have designed.

The reaction which is supposed to take place between dilute sulfuric acid and ferrocyanid of potash is generally represented as follows:

(1) $2K_4FeCy_6 + (3+x)H_2SO_4 =$
$\quad 6HCy + K_2Fe_2Cy_6 + 3K_2SO_4 + xH_2SO_4$ in which $x$ represents any figure up to three. Thus one half of the total cyanogen should be made available as hydrocyanic acid for the preparation of cyanids, while the other half should be obtained in the form of the insoluble compound which is generally termed "Everitt's salt;" but this reaction does not take place regularly according to the equation, and therefore varying quantities of hydrocyanic acid are evolved. I have, however, ascertained that whatever the yield of hydrocyanic acid the resulting Everitt's salt contains exactly the amount of cyanogen corresponding to the difference between the total cyanogen originally contained in the ferrocyanid and that evolved as hydrocyanic acid in such a form that it can be practically quantitatively reconverted into alkali ferrocyanid. I have, moreover, found that for the purpose of my process two molecules of ferrocyanid to three molecules of sulfuric acid (with about five per cent. of the latter in excess) are most practicable, as the waste liquors are almost neutral.

The equation which is given in text-books as representing the action of alkali on Everitt's salt is as follows:

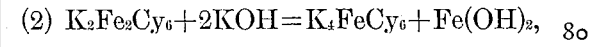

(2) $K_2Fe_2Cy_6 + 2KOH = K_4FeCy_6 + Fe(OH)_2,$

*i. e.*, ferrocyanid and ferrous hydrate are formed; but the quantity of ferrocyanid reconverted is far below theory unless a large excess of caustic be used and boiling prolonged for an impracticable time, while the air is excluded, so as to obtain the ferrous hydrate according to the equation; but I have found that if care is taken to supply sufficient air during the boiling to produce not the ferrous hydrate, but a higher oxid of iron, this reaction takes place quantitatively with a very small excess of caustic alkali and in a very short time. My reaction is therefore as follows:

(3) $3K_2Fe_2Cy_6 + 6KOH + yO = 3K_4FeCy_6 + Fe_2O_{(3+y)} + 3H_2O.$

Everitt's salt may also be converted into ferrocyanid by boiling it with solution of carbonate of alkali by itself or mixed with caustic alkali in the presence of air in excess, or boiling it with an alkaline earth in conjunction with a solution of a carbonate of alkali in the presence of air in excess, or by boiling it with an alkaline earth and water in the presence of air in excess and subsequently decomposing any single or double salt of an alkaline earth formed with alkali carbonate.

The conversion of the hydrocyanic acid into cyanid of potassium may be expressed by the equation (4) $KOH + HCy = KCy + H_2O.$ As long as the temperature does not rise too high the absorption of the hydrocyanic acid by caustic-alkali solution is almost complete. I find the same to be the case with caustic lime or milk of lime, which produces calcium cyanid.

It will be seen from equation (1) that during the distillation of hydrocyanic acid an equivalent quantity of sulfate of potash is formed, and I have found that if the hydrocyanic acid evolved be absorbed in milk of lime the cyanid of calcium thus produced can be converted into potassium cyanid by mixing with the solution of potassium sulfate obtained as above, or the slaked lime may be mixed with the solution of potassium sulfate and the mixture used for absorbing the hydrocyanic acid, when the formation of calcium cyanid and its conversion into potassium cyanid take place simultaneously. The resulting potassium-cyanid solution may be separated from the precipitate of calcium sulfate by decantation or filtration. Sodium sulfate or a mixture of this and potassium sulfate gives analogous results.

I have also found that sodium ferrocyanid behaves exactly like the potassium ferrocyanid as regards the evolution of hydrocyanic acid and as regards the relation in the composition of the resulting sodium Everitt's salt and the quantity of hydrocyanic acid evolved. Mixtures of potassium and sodium ferrocyanid also behave analogously. So do double salts, such as calcium-potassium ferrocyanid and similar compounds.

I have also found that caustic soda behaves analogously to caustic potash in the conversion of Everitt's salt into ferrocyanid. So do mixtures of caustic soda and potash.

It appears from the foregoing that my invention comprises a combination of the following operations: First, distillation of hydrocyanic acid; second, absorption of the hydrocyanic acid and further treatment of the resulting cyanid solution; third, reconversion of the Everitt's salt. These operations are carried out on a large scale as follows:

*First. Distillation of hydrocyanic acid.*— I have found that lead is not acted on either by the mixture of ferrocyanid and sulfuric acid or by hydrocyanic acid, and I therefore prefer to carry out this operation in a still made of lead; but enameled iron or other suitable material may be used for its construction when it is advisable to do so. Separate pipes for the supply of live steam, air, sulfuric acid, and ferrocyanid solution go to the bottom of the still, which may also contain a steam-coil for heating by confined steam. It is connected at the top with a dephlegmating or fractionating apparatus, which may be cooled by water, cold air, or otherwise. I have found that the vapor of hydrocyanic acid does not act on iron, and the dephlegmating arrangement therefore can be made of that material. Pipes lead from the dephlegmating apparatus to a number of absorbing vessels made of iron or other suitable material and fitted with suitable agitating machinery. The whole system is at its outlet connected with a Körting exhauster or similar apparatus for producing a partial vacuum or for drawing air through under a partial vacuum or otherwise.

A suitable apparatus to be preferably used for the distillation of the hydrocyanic acid is shown in the accompanying drawing.

A is a still, preferably made of lead; $a$ and $c$ are pipes leading from the storage vessels C and D into the still and convey sulfuric acid and the solution of ferrocyanid, respectively, into that still. For heating the still live steam is conveyed to it by the pipe $b$, whereas the still is emptied by means of the running-off pipe $d$. The hydrocyanic acid evolved passes through the dephlegmating or condensing tower B, whence it goes forward first into the absorption vessel E, thence into the absorption vessel F, and finally into the absorption vessel $g$, all of which are charged with a solution of caustic alkali. The last traces of hydrocyanic acid are retained in the vessel $g$ with perfect safety.

H is a Körting injector connected to the last absorbing vessel, by which a partial vacuum is produced which is maintained in the whole apparatus while the process of distillation is going on.

When an operation is commencing, the necessary quantity of hot saturated solution of ferrocyanid of potash containing about twenty-five per cent. of crystallized ferrocyanid is run into the still, (which in a continuous process will be still hot from a previous operation.) All the taps are closed and the exhauster is set to work, so as to keep up a partial vacuum of about four inches of mercury. The taps for live and confined steam are then turned on and the acid, which contains about twenty-five per cent. $H_2SO_4$, is run in slowly at the rate of about one gallon per minute or slower. The quantity of acid used is about three per cent. to five per cent. in excess of the quantity necessary to form the three molecules of neutral potassium sulfate, corresponding to two molecules of ferrocyanid. The apparatus works very regularly, and when once it has been ascertained how long it takes to finish an operation it will be found that subsequent operations under the same conditions will finish in the same time. The ferrocyanid used should be reasonably free from carbonates, sulfids, and other ingredients which may either interfere with the reaction in the still or influence the quality of cyanid produced.

Several stills supplied with overflows and suitably connected may be combined in such a manner as to work continuously.

During part or the whole of the operation a current of air heated or otherwise may be passed through the still.

*Second. Absorption of the hydrocyanic acid and further treatment of the resulting cyanid solution.*—The absorption vessels are closed boxes or pots, made of iron or other suitable material, fitted with agitating machinery and of such size that they will hold sufficient alkaline liquors to condense the hydrocyanic acid and the vapor evolved from four or more still operations. Two, three, or more of these vessels are arranged in series, preferably at increasing heights, so that the liquid from the higher can be drawn into the lower vessel or vessels. The hydrocyanic acid enters the lower vessel first, is taken to the bottom, the gas leaves through a pipe at the top and is drawn through the box or boxes at a higher level in the same manner. The boxes are charged with a solution of caustic soda, caustic potash, or a mixture of both. If it is desirable to produce calcium cyanid, they may be charged with milk of lime, and, further, slaked lime may be added after one or several operations; but in every case care must be taken that there is always slight excess of free caustic and never any free hydrocyanic acid. If it is desired to use sulfate of potash or soda or a mixture of both, the respective solutions may be mixed with slaked lime, the mixture charged into the absorption-pots, and further quantities of lime and sulfate, the latter either in concentrated solution or in the solid state, may be added after one or several still operations. The temperature is regulated by cooling the absorption-pots. It is advisable to keep it below 40° centigrade. When the first absorbing vessel is sufficiently saturated with hydrocyanic acid, which is ascertained by test, its contents are run off into suitable covered tanks, and the pot may be recharged. When soda or potash has been used for absorption, no further treatment is required, nor when lime has been used for absorbing for the purpose of making cyanid of lime for use as such in solution; but when cyanid of lime has been made as an intermediate product and has to be converted into the potassium or sodium compound it is decomposed by its equivalent or an excess of sulfate of potash or soda or a mixture of both. When a mixture of sulfate of alkali and lime has been used for absorbing, the resulting mass is practically of the same composition as the calcium cyanid and sulfate of alkali mixture mentioned above. The mass in either case is left to settle in closed vessels, guarded against access of air and light, and the liquor separated from the precipitate by decantation and the latter washed, or the filtration and washing may be carried out by means of a centrifugal machine or a filter-press. The resulting liquor, which contains sulfate of lime, soda, and potash, besides cyanid, may be purified by the addition of carbonate of alkalis or by the successive addition of cyanid of barium and carbonate of alkali or by any other means well known and apparent to chemists. The liquors, purified or otherwise, obtained by either of the above means may be concentrated or made into solid by boiling down in a suitable vacuum-pan. Whenever lime has been used for absorption, care should be taken that no cyanid of calcium as such may be conveyed to the vacuum-pan or may form in the process of evaporation.

*Third. Reconversion of the Everitt's salt.*— The contents of the still after distillation is finished are run into tanks and the solution of alkali sulfate separated from the Everitt's salt by decantation or filtration. The alkali sulfate, which is slightly acid, is neutralized by means of calcium carbonate, alkali carbonate, or other suitable means, and may then be further purified and afterward concentrated by boiling down, crystallizing, or fishing. The Everitt's salt, which need not be quite free from sulfate, is made neutral by means of alkali carbonate or caustic alkali and mixed with the equivalent quantity plus about five per cent. of caustic soda or potash or a mixture of both or of carbonate of alkali. It is heated in suitable vessels and of such capacity as will contain the large quantity of froth which is produced during the operation, either by steam or other means, to boiling, is violently agitated, and air is passed through by means of a compressor or steam-injector until a test shows that all the Everitt's salt has been decomposed. The air may be heated or otherwise. With some experience the time necessary for this can be fixed approximately for each operation after a few trials. The color of the precipitate of iron produced should be brownish black when the operation is finished. The resulting solution of alkali ferrocyanid may be separated from the iron compound by decantation or filtration and the latter washed free from ferrocyanid. The resulting ferrocyanid solution is carefully neutralized with suitable acid or by other means and may go back into the process either as solution or it may be further concentrated or boiled down and crystallized.

Instead of passing air through in the manner described the equivalent of agitating violently in presence of air, so as to expose the whole to its action, may be adopted, but not so advantageously.

Instead of using caustic alkali; carbonate of alkali, a mixture of carbonate and caustic alkali, may be used in equivalent proportions, or alkali earths, such as milk of lime and carbonate of alkali, may be used either simultaneously or in this way, that the alkali earth is added first up to the finishing of the oxidation and the alkali carbonate added afterward. In the case of a difficultly-soluble alkaline earth, such as lime, more than the equivalent proportion of the earth should be used.

Instead of sulfuric acid suitable acid sulfates—such as sodium-potassium bisulfate, niter cake, or similar compounds—may be used.

I have so far confined myself to the action of sulfuric acid on ferrocyanids, being the most practicable form of my process, in so far as it enables me to use lead for the distilling apparatus and to recover the alkali contained in the original ferrocyanid as sulfate, which can be made available as described above; but it is well known that if hydrochloric, phosphoric, or similar acids are used hydrocyanic acid and Everitt's salt are produced, and I have found that practically the reaction takes place in the same way as with sulfuric acid and that with hydrochloric, phosphoric, and similar acids, whatever the yield of hydrocyanic acid, the resulting Everitt's salt contains exactly the amount of cyanogen corresponding to the difference between the total cyanogen originally contained in the ferrocyanid and that evolved as hydrocyanic acid in such a form that it can be practically quantitatively reconverted into alkali ferrocyanid.

Having now particularly described and ascertained the nature of my said invention and in what manner the same is to be performed, I declare that what I claim is—

In the manufacture of cyanids from ferrocyanids, the process herein described consisting in decomposing ferrocyanids with a mineral acid, absorbing the hydrocyanic acid evolved in caustic alkali and reconverting the insoluble residue of metal ferro ferrocyanid obtained by the decomposition of ferrocyanids with acids, into ferrocyanid by boiling with a caustic alkali in the presence of air in excess, substantially as described.

In testimony that I claim the foregoing as my invention I have signed my name in presence of two subscribing witnesses.

JACOB GROSSMANN.

Witnesses:
WILLIAM EDGAR SIMS,
JAMES ANDREW STEELE.